United States Patent [19]
Walker et al.

[11] Patent Number: 6,128,599
[45] Date of Patent: Oct. 3, 2000

[54] METHOD AND APPARATUS FOR PROCESSING CUSTOMIZED GROUP REWARD OFFERS

[75] Inventors: Jay S. Walker, Ridgefield; Sanjay K. Jindal, Wilton; Toby Weir-Jones, Stamford, all of Conn.

[73] Assignee: Walker Asset Management Limited Partnership, Stamford, Conn.

[21] Appl. No.: 08/948,144

[22] Filed: Oct. 9, 1997

[51] Int. Cl.[7] ........................................ G06F 17/60
[52] U.S. Cl. .................... 705/14; 235/380; 705/38; 705/39
[58] Field of Search ................... 705/10, 14, 21, 705/30, 34, 35, 38, 39, 40; 235/375, 379, 380, 381

[56] References Cited

U.S. PATENT DOCUMENTS

| | | | |
|---|---|---|---|
| 5,025,372 | 6/1991 | Burton et al. | 705/14 |
| 5,053,957 | 10/1991 | Suzuki | 705/14 |
| 5,056,019 | 10/1991 | Schultz et al. | 705/14 |
| 5,287,268 | 2/1994 | McCarthy | 705/14 |
| 5,297,026 | 3/1994 | Hoffman | 705/14 |
| 5,466,919 | 11/1995 | Hovakimian | 705/17 |
| 5,483,444 | 1/1996 | Heintzeman et al. | 705/5 |
| 5,537,314 | 7/1996 | Kanter | 705/14 |
| 5,621,640 | 4/1997 | Burke . | |
| 5,710,886 | 1/1998 | Christensen et al. | 705/14 |

OTHER PUBLICATIONS

Mary Ann McNulty, "GE Capital Idea: Push Policy", Business Travel News, Jul. 14, 1997.
"GE Capital Consumer Financial Services"(http://www.ge.com/capital/consumer/rewards.htm) download date Mar. 12, 1998.
"New Partners More Exciting Rewards: The Membership Rewards Program for 1998" (http://www.americanexpress.com/rewards/news/docs/1998new‾mr.shtml) download date Mar. 12, 1998.
"BCAA/Mohawk Credit Card" (http://www.bcaa.bc.ca/auto/body‾auto‾prod.html) download date Mar. 12, 1998.
"The Centura Cashmax Card" (http://www.centura.com/cashcards/cashmax.html) download date Mar. 12, 1998.
"Customer Rewards" (http://www.chase.com/goldvisa/rewards.html) download date Mar. 12, 1998.
"Citibank Cards and Services" (http://www.citibank.com/us/cards/crd‾svc/citiccard/) download date Mar. 12, 1998.
"Earning and Redeeming Rebates" (http://www.citibank.com/us/cards/drivers–edge/earning.html) download date Mar. 12, 1998.
"Discover Card Features" (http://www.discovercard.com/discover/data/features.htm) download date Mar. 12, 1998.
"Kmart Rewards Earn Up To 6%" (http://www.kmart.com./a%5Fprod/a1%5Fcre/a 1a%5Frew/a1a%5Fct.stm) download date Mar. 12, 1998.
"Mobil Speedpass" (http://www.mobil.com/business/credit/fleet/product.html) download date Mar. 12, 1998.
"State Capitol Credit Union" (http://www.capitolcu.org/credcard.html)download date Mar. 12, 1998.
Peter Sinton, "Pick A Card, But Not Just Any Card", The San Francisco Chronicle, Oct. 10, 1994 at p. D1.
Cliff Jones, "Plastic Interest in Sweet Charity", The Guardian, Dec. 10, 1994 at p. 35.

(List continued on next page.)

*Primary Examiner*—Stephen R. Tkacs
*Attorney, Agent, or Firm*—Dean Alderucci; Kurt M. Maschoff

[57] ABSTRACT

The present invention is an apparatus for providing and managing a customized reward offer to an affinity group sponsor based on the aggregate performance of members of the group. The apparatus includes a processor configured to accesses historical aggregate data associated with the affinity group. The processor is further configured to determine a performance target associated with the affinity group. The processor is also configured to determine aggregate performance data based on the historical data and determine a performance target based on the aggregate performance data.

52 Claims, 8 Drawing Sheets

OTHER PUBLICATIONS

Drexel Alumni Affinity Card (http://alum.ia.drexel.edu), Jan. 1, 1996.

Jay Greene, "They're Selling Your Secrets", The Orange County Register, Apr. 21, 1996 at p. A01.

Edmund Sanders, "Card Sharks", The Orange County Register, Jun. 15, 1997 at p. K01.

Alan Jolis, "The Good Banker", The Independent, May 5, 1996.

"Affinity Cards", BradescoNet Internet Banking (http://www.bradesco.com.br/veringl/ccard/affinity/closedc.html), download date: Jul. 21, 1996.

"MasterCard Affinity Card", McGill University (http://www.mcgill.ca/alumni/m¯card.html), download date: Jul. 21, 1996.

"The Binghamton University Alumni Association Mastercard(R) Credit Card", Binghamton University (http:www.webapply.com/bingu/apply.html), download date: Jul. 21, 1996.

"AAA Michigan Savings", AAA Group Insurance (http://www.aamich.com/savings/group/index.html), Mar. 25, 1997.

Chris O'Malley, "RCA Seeks to Collar the Affinity Credit–Card Market", The Indianapolis Star, Mar. 28, 1997 at p. F01.

"Choosing A Credit Card", The Times, Jul. 5, 1997.

300

| AFFINITY GROUP ID 310 | SPONSOR 312 | ADDRESS 314 | REWARD PREFERENCE 316 | REWARD LEVEL 318 |
|---|---|---|---|---|
| 000001 | CHURCH GROUP | 1234 RELIGION LN. HOMETOWN, CT 66666 | FREQUENT FLIER MILES | 2 |
| 000002 | ALUMNI ASSOCIATION | 99 SCHOOLHOUSE DR. COLLEGETOWN, NY 22222 | PERCENTAGE OF CHARGE VOLUME | 1 |
| 000003 | YOUTH GROUP | 45 CHILDHOOD AVE. ANYTOWN, USA 50540 | FLAT DONATION PER MEMBER ACCOUNT | 1 |
| 000004 | PROFESSIONAL ASSOCIATION | 1040 OFFICE RD. PAPERVILLE, CA 99999 | PERCENTAGE OF OUTSTANDING BALANCE | 3 |

| AGGREGATE QUARTERLY CHARGE VOLUME 320 | AGGREGATE QUARTERLY OUTSTANDING BALANCE 322 | AGGREGATE TRANSACTION PER MONTH 324 | AVERAGE MEMBER RISK SCORE 326 | NUMBER OF MEMBERS 328 |
|---|---|---|---|---|
| $150,000 | $100,000 | 1,000 | 25 | 100 |
| $720,000 | $360,000 | 6,000 | 72 | 2,000 |
| $750,000 | $500,000 | 5,000 | 90 | 1,000 |
| $1,500,000 | $100,000 | 5,000 | 10 | 250 |

| ACCOUNT ID 410 | CARDHOLDER NAME 412 | ADDRESS 414 | TELEPHONE NUMBER 416 | TOTAL CREDIT LINE 418 | AVAILABLE CREDIT LINE 420 |
|---|---|---|---|---|---|
| 2222-3333-4444-5555 | TIM SMITH | 99 MAIN ST. HOMETOWN, CT 22222 | (333) 444-5555 | $2,000 | $1,233 |
| 9999-9999-9999-9999 | SUE C. CARDHOLDER | 10 CENTER ST. ROCKPORT, NJ 99999 | (999) 111-2222 | $3,500 | $0 |
| 7777-3333-2222-1111 | JOHN JOHNSON | 123 ELM ST. SMALLTOWN, USA 00551 | (222) 777-8888 | $10,000 | $10,000 |
| 1212-5555-4444-3333 | TOM JACOBS | 10 OCEAN AVE. WATERSIDE, NY 99999 | (999) 999-0000 | $15,000 | $5,000 |
| 9898-6666-7777-8888 | SAM JONES | 987 MAIN ST. ANYTOWN, USA 00551 | (222) 333-4444 | $5,000 | $300 |

| AVERAGE QUARTERLY CHARGE VOLUME 422 | AVERAGE QUARTERLY OUTSTANDING BALANCE 424 | AVERAGE QUARTERLY TRANSACTIONS PER MONTH 426 | RISK SCORE 428 | AFFINITY GROUP ID 430 |
|---|---|---|---|---|
| $1,000 | $500 | 8 | 35 | 000001 |
| $3,000 | $2,000 | 20 | 58 | 000002 |
| $4,000 | $0 | 35 | 75 | 000003 |
| $0 | $0 | 0 | 20 | 000001 |
| $100 | $4,500 | 2 | 65 | 000002 |

FIG. 4

| AFFINITY GROUP ID 510 | TARGET PERIOD 512 | TARGET TYPE 514 | TARGET PARAMETER 516 | PERFORMANCE PARAMETER 518 | REWARD TYPE 520 | REWARD TERMS 522 |
|---|---|---|---|---|---|---|
| 000001 | 1ST QUARTER 1998 | AVERAGE CHARGE VOLUME | $175,000 | $150,000 | CASH REBATE | 1% FOR CHARGES UP TO $150,000; 2% FOR CHARGES OVER $150,000 |
| 000002 | 1ST QUARTER 1998 | AVERAGE TRANSACTIONS PER MONTH | $7,000 | $6,000 | FLAT CONTRIBUTION | $5.00 / AFFILIATED ACCOUNT |
| 000003 | 1ST QUARTER 1998 | AVERAGE DEFAULT PERFORMANCE | 3.25% | 4.25% | FREQUENT FLIER MILES | 1.5 MILES / DOLLAR |
| 000004 | 1ST QUARTER 1998 | AVERAGE OUTSTANDING BALANCE | $125,000 | $125,000 | FREQUENT FLIER MILES | 1.5 MILES / DOLLAR |

FIG. 5

| TRANSACTION ID 608 | ACCOUNT ID 610 | MERCHANT ID NUMBER 612 | TRANSACTION AMOUNT 614 | DATE 616 | TIME 618 | CREDIT CARD AUTHORIZATION NUMBER 622 |
|---|---|---|---|---|---|---|
| 11223333 | 2222-3333-4444-5555 | 22334 | $19.75 | 2/15/97 | 3:05 PM | 4062 |
| 11324444 | 2222-3333-4444-5555 | 32454 | $38.25 | 3/10/97 | 1:30 AM | 4321 |
| 15478899 | 2222-3333-4444-5555 | 13987 | $45.84 | 3/11/97 | 4:16 PM | 1156 |
| 43219876 | 2222-3333-4444-5555 | 48965 | $235.18 | 3/14/97 | 10:15 AM | 9587 |
| 56781234 | 7777-3333-2222-1111 | 32340 | $36.75 | 3/6/97 | 1:26 PM | 0613 |
| 96385274 | 9999-8888-9999-9999 | 93407 | $401.60 | 2/28/97 | 12:07 AM | 6460 |

METHOD AND APPARATUS FOR PROCESSING CUSTOMIZED GROUP REWARD OFFERS

CROSS-REFERENCE TO RELATED APPLICATION

The present invention is related to the following U.S. patent application: "Method and Apparatus for Processing Customized Reward Offers," U.S. patent application Ser. No. 08/921,868, assigned to the assignee of the present invention and incorporated by reference herein.

BACKGROUND OF THE INVENTION

1. Technical Field

The present invention relates generally to methods and systems for promoting the use of financial accounts. More particularly, the present invention relates to a method and system which facilitates generating, communicating and managing a customized reward offer presented to a group of account holders to benefit an affinity group sponsor.

2. Description of the Related Art

Tens of millions of credit card holders have an account which is sponsored by an affinity group partner. Methods and systems for promoting usage of credit card accounts based on affinity relationships are well known. Such methods and systems are generally designed to reward the affinity group sponsor based on account usage of credit card holders belonging to the sponsor's affinity group.

Many credit card issuers offer credit card accounts sponsored by an affinity partner. These credit card issuers believe a credit card holder who is a member of an affinity group is more likely to use his account if it benefits the affinity group sponsor. Credit card issuers further expect higher response rates and reduced attrition rates for credit card accounts sponsored by an affinity partner. Examples of affinity group sponsors include trade groups, alumni associations, religious organizations, sports teams and professional associations.

An affinity group sponsor typically receives three types of benefits from a credit card issuer. The first benefit credit card issuers generally offer to an affinity group sponsor is a finder's fee for acquiring each new affinity group related account. The second common benefit an affinity group sponsor may receive is a percentage rebate on all affinity card holder account transactions. Affinity group sponsors may also receive a portion of all finance charges applied to affinity card holder accounts.

One example of an affinity credit card is the People's Bank Visa Card that is sponsored by the National Rifle Association ("NRA"). The NRA receives 0.5% rebate for all transactions conducted through card holder accounts which are affiliated with the NRA. Drexel Alumni Affinity Card and Binghamton University Alumni Association MasterCard are two other examples of credit cards affiliated with an affinity group sponsor. These alumni associations receive contributions for every charge made by an affiliated card holder.

Although there are currently programs which enable affinity group sponsors to benefit from card holder account performance, there are significant shortcomings associated with these types of programs. A first shortcoming is the absence of a definite periodic performance target. Because an affinity group sponsor is rewarded for virtually any account usage by affiliated card holders, the affiliated card holders are not necessarily encouraged to increase their account usage. An affinity group sponsor continues to earn rewards even if the charge volume of many affiliated card holders during a particular period drops significantly compared to a previous period. In fact, many card holders may rely on the other members of the affinity group to provide benefits to the sponsor.

A second shortcoming of such programs is that the rewards are based on a projection of member card holder activity at the inception of the program. The reward level, therefore, is not set or adjusted based on actual performance.

Another shortcoming of such programs is that an issuer using a current credit card issuer reward processing system cannot share the risks of poor group performance with the affinity group sponsor. For example, consider a program that rewards a sponsor for every dollar charged by an affiliated member. If the affinity group's aggregate default rate is higher than the industry average (or the particular bank's average), the affinity group sponsor continues to earn rewards associated with affinity group member charges. Using prior art processing systems, no penalty can be imposed on the sponsor for poor payment on the part of the affinity group members. Furthermore, current systems do not provide a measurable means by which affinity group sponsors can influence affinity members to preferentially use the affinity credit card over another credit card or to preferentially pay the affinity credit card over another credit card.

Present affinity card programs are also limited in terms of awarding rewards to only the affinity group sponsor for customer acquisition. There is no system in place that enables members of an affinity group to enroll other members and earn subsequent rewards for themselves and/or for the group.

Accordingly, the shortcomings associated with the related art have heretofore not been adequately addressed. The present invention addresses such problems by providing a system and processing approach that have not previously been proposed.

SUMMARY OF THE INVENTION

The present invention provides a method and system to define, manage and evaluate group reward offers which are customized based on specific criteria of affiliated account holders and presented to an affinity group sponsor. Accordingly, affiliated account holders may be induced to exhibit behavior desired by an account issuer.

The present invention also provides a method and system that enables affinity group card members to accrue rewards or penalties based on aggregated affinity group performance, not simply on the individual card member performance.

A first method is disclosed for generating a customized reward offer for a sponsor of an affinity group. The first method includes the step of accessing transaction data associated with said at least one financial account controlled by a member of the affinity group. The first method also includes the step of determining aggregate performance data based on the transaction data. The aggregate performance data describes activity of the member accounts. The first method further includes the step of determining a performance target based on the aggregate performance data.

A second method is disclosed for processing a reward for a sponsor of an affinity group based on at least one affiliated financial account. The second method includes the step of retrieving performance target data, including a group performance target, associated with the affinity group. The second method also includes the step of aggregating member transaction data to determine an aggregated performance value.

The aggregated performance value is compared to the group performance target to determine whether the reward has been earned. If the reward has been earned, reward offer data associated with the performance target data is accessed, and affinity group account data is updated to reflect the reward.

An apparatus and processing instructions embodied in a storage media are also disclosed. The disclosed apparatus and processing instructions implement the step of the above described methods.

It is an object of the present invention to provide a method and system for promoting the use of a financial account which enables a credit card issuer to tailor targets and rewards based on affinity group characteristics. The above object and other objects features and advantages are readily apparent from the detailed description when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings, wherein:

FIG. 3 is a table illustrating the data maintained in an affinity group table stored at the credit card central controller;

FIG. 4 is a table illustrating the data maintained in a card holder account table stored at the credit card issuer central controller;

FIG. 5 is a table illustrating the data maintained in a group target/reward table stored at the credit card issuer central controller;

FIG. 6 is a table illustrating the data maintained in a transaction table stored at the credit card issuer central controller;

DETAILED DESCRIPTION

System Architecture

Figure 1:
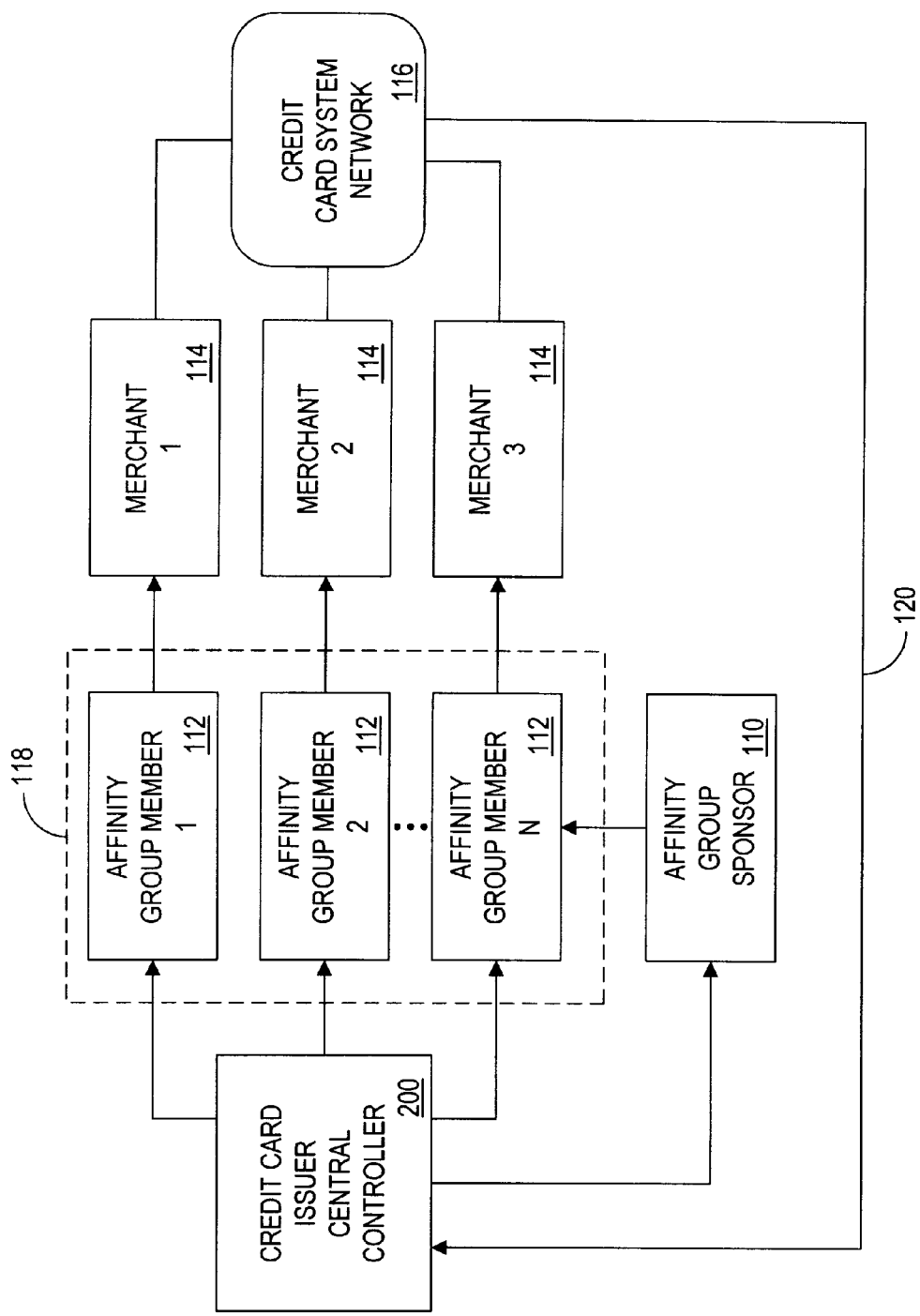
FIG. 1 is a schematic block diagram illustrating the information flow between parties according to the present invention.

An embodiment of the method and system of the present invention will now be discussed with reference to FIGS. 1–9. FIG. 1 illustrates, in schematic block diagram format, the information flow between relevant parties according to one embodiment of the present invention. As shown, a credit card issuer central controller ("CCI") 200 communicates with an affinity group sponsor 110 and various credit card holders 112 (also referred to as "Affinity group members"). As shown, credit card holders 112 are members of an affinity group 118 sponsored by affinity group sponsor 110.

Generally, CCI 200 receives demographic and other information from sponsor 110 relating to group 118. CCI 200 will periodically transmit benefit information to sponsor 110. This transmission may be an electronic funds transfer, a monthly statement or data transmission to a third party acting on behalf of the affinity group sponsor such as a frequent flyer program administrator. CCI 200 also transmits information to each credit card holder 112. Although such information may be transmitted electronically, it is typically transmitted via a periodic account statement (not shown).

According to the present invention, CCI 200 accesses stored data associated with group 118 to determine a performance target and an associated reward. The accessed data may include demographic, preference and performance data relating to sponsor 110, transaction data relating to the accounts of the credit card holders 112 of group 118, aggregated data describing member preferences, performance or behavior of group 118, and data relating to a population of card holders larger than the size of group 118.

CCI 200 then determines a performance target for group 118 and selects a reward to offer sponsor 110 if credit card holders 112 of group 118 behave in accordance with the performance target. As shown in FIG. 1, this customized group reward offer, including the performance target, the reward and a target period, is preferably transmitted to both sponsor 110 and affiliated credit card holders 112.

After receiving the transmission of the customized reward offer from CCI 200, credit card holders 112 may initiate and complete transactions directly affecting their respective credit card accounts and indirectly affecting the performance of group 118 in an effort to help achieve the communicated performance target. As shown, transactions may be conducted with various merchants using point-of-sale ("POS") terminals 114.POS terminal 114 comprises a POS processor, such as one or more conventional microprocessors, which is connected to each of a card reader for reading input from credit cards and a data storage device, such as a RAM, floppy disk, hard disk or combination thereof. POS terminal 114 collects transaction data and transmits it to CCI 200 through POS network 116. This transaction data is stored by CCI 200 and is used to manage the account of credit card holders 112.

The POS processor and the storage device of POS terminal 114 may each be (i) located entirely within a single computer or other computing device; (ii) connected to each other by a remote communication link, such as a serial port cable, telephone line or radio frequency transceiver; or (iii) a combination thereof. For example, the POS terminal 114 may comprise one or more computers connected to a remote server computer for maintaining databases. The card reader may be any of several known devices that allow a credit card to be passed ("swiped") therethrough, thereby permitting information stored on the credit card to be read. One such card reader is an OMNI 490, sold by VeriFone Inc.

At the end of the target period, CCI 200 uses the transaction data collected during the target period to determine a performance value representing the performance of group 118. CCI 200 then compares the performance value to the performance target to determine if group 118 has achieved the performance target. If group 118 has achieved the performance target, CCI 200 rewards sponsor 110 according to the terms of the reward offer. This could include crediting an account of sponsor 110 or transmitting reward information to a third party administrator. In the preferred embodiment, CCI 200 transmits to affiliated credit card holders 112 an announcement of the reward earned by group 118 for achieving the performance target.

In the preferred embodiment, CCI 200 will process reward offers for successive periods. Accordingly, CCI 200 may evaluate the collected transaction data during a first target period to determine a group performance target for a second subsequent period. In alternate embodiments, the determination of the second group performance target could be completed at or subsequent to the end of the first target period. The determination of the second group performance target is based on the first group performance target and the transaction information collected since the transmission of the first customized group reward offer. The determination of the second group performance target may also be based on other group profile data.

Figure 2:
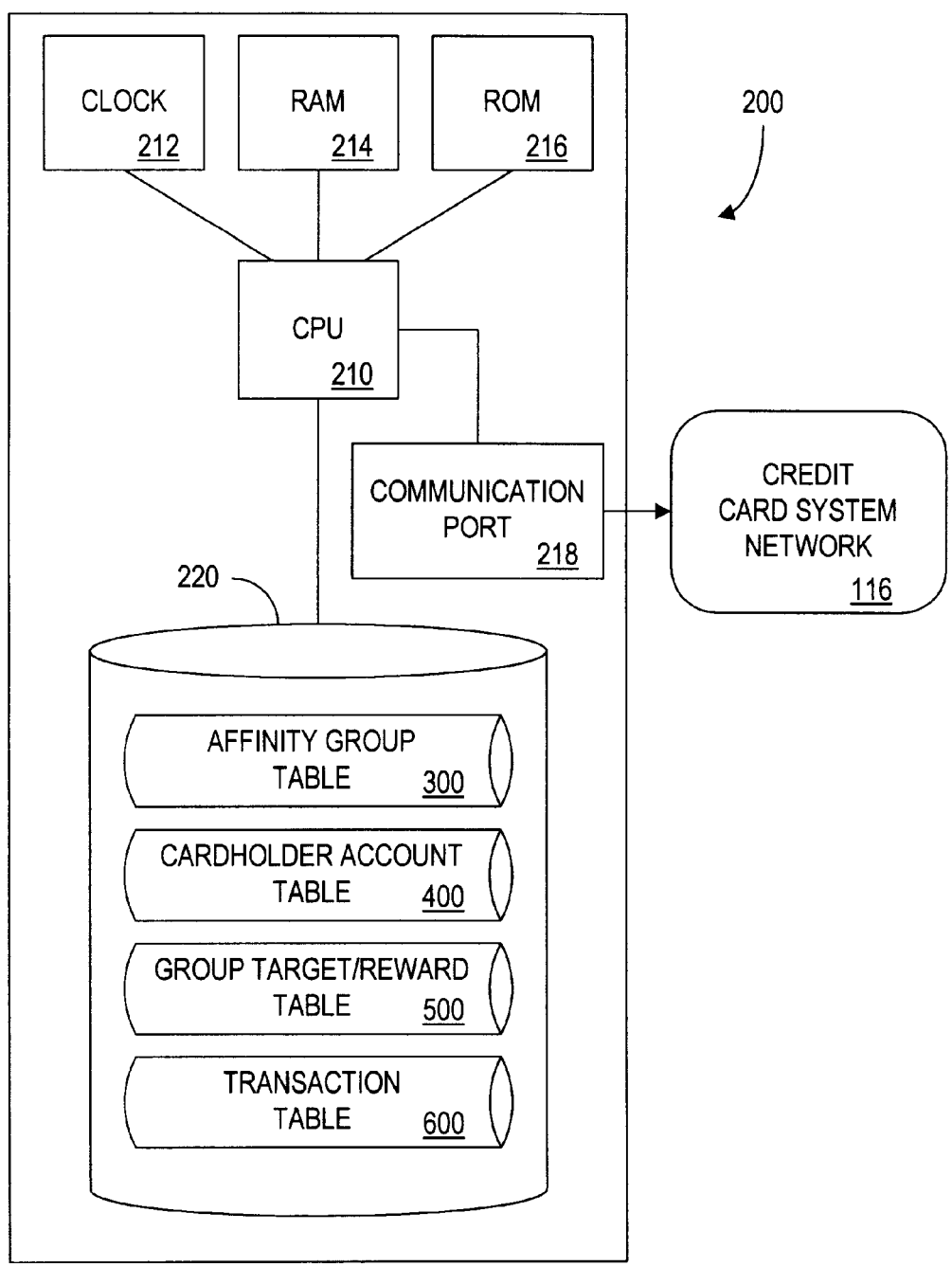
FIG. 2 is a schematic block diagram illustrating the components of a credit card issuer central controller according to one embodiment of the present invention.

Referring now to FIG. 2, CCI 200 is illustrated in greater detail. As shown, CCI 200 includes a central processing unit ("CPU") 210, a clock 212, a random access memory ("RAM") 214, a read only memory ("ROM") 216, a communication port 218, and a storage device 220. Communication port 218 provides a connection between CCI 200 and POS network 116 allowing communication between CCI 200 and POS network 116.

As shown in FIG. 2, storage device 220 stores a database of account, target and reward data, including an affinity group table 300; a card holder account table 400; a group target/reward table 500; and a transaction table 600. Tables 300, 400, 500 and 600 comprise at least a portion of the database stored by storage device 220 and are described more fully with reference to FIGS. 3–6 respectively. Storage device 220 is preferably a magnetic disk drive, but could be a CD-ROM drive, optical disk drive, RAM drive or any other conventional storage device.

Data Tables

FIG. 3 illustrates the contents of an exemplary affinity group table 300 in tabular format. Each record of affinity group table 300 contains information pertaining to the identity and characteristics of an affinity group. Affinity group ID field 310 is a key field and stores a unique affinity group identifier. Sponsor field 312 stores the name of the sponsor of the affinity group. Address element 314 stores the mailing address of the affinity group sponsor and may include more than one field.

Fields 316–328 describe various characteristics of the affinity group sponsor and its affiliated members. Reward preference field 316 stores a code representing the type of reward preferred by the affinity group sponsor. Field 318 stores a reward level of the group. The reward level data is used to determine and distribute a reward for the affinity group sponsor. Field 320 stores an aggregate quarterly charge volume of the affinity group's affiliated members. Field 322 stores an aggregate quarterly outstanding balance of the affinity group's affiliated members. Field 324 stores a value representing an aggregate number of transactions conducted per month by the card holders affiliated with the affinity group. Field 326 stores an average risk score of the card holders affiliated with the affinity group. Field 328 stores the number of members affiliated with the affinity group.

Fields 320–328 can be used as criteria to determine appropriate performance targets. As more fully described with reference to FIG. 4, many of these criteria are also tracked for individual card holders. Although only four criteria are shown in FIG. 3, one skilled in the art will recognize various other criteria which may be used to determine performance targets in an effort to influence card holder behavior.

One method presently employed by credit card issuers to predict and influence card holder behavior is determining a score defined by a scoring system. Scoring systems are mathematical models designed to provide probabilities of future performance based on a creditor's actual historic performance. Models are developed from past behavior and data relationships and are used to identify predictive variables. Scoring systems can be used as absolute decision tools or in combination with judgmental and expert system rules.

Credit card issuers are currently using scores to determine: who will respond to an offer; who will reliably repay credit; and who will generate revenue for a lender. These scores are known as response scores, risk scores and revenue scores, respectively. Response Scores are used to determine how to modify solicitations for maximum results and for areas of the country that have the greatest growth potential for specifically designed card products like insurance or investment cross-sells. Risk Scores are used to predict delinquencies and bankruptcies. They are also used to predict the extent and timing of monthly payments. Revenue scores assign a ranking to individuals by the relative amount of revenue they are likely to produce over a period of time following score assignment. Revenue scores help issuers in account management by identifying inactive accounts that ought to be targeted with an appropriate offer and by identifying the most desirable prospects for acquisition.

A score may also be classified as either a credit score or a behavior score. A credit score is a statistical measure used by creditors to determine whether to extend credit in the form of a loan or as a credit line on a credit card. Credit scores takes into account many factors, including: annual income, years at current job, residence, debt payment history, current debt obligations and long term debt obligations. Creditors may assign different weights to these criteria to compute a credit score.

A behavior score is another statistical measure used by issuers to better manage individual accounts to maximize profit per account. The behavior score can include more than 50 different characteristics, including: extent of monthly payments, promptness of payment, use of card for purchases or cash advances, size and type of purchases and types of spending categories among others.

FIG. 4 illustrates the contents of card holder account table 400 in tabular format. Each record of account table 400 includes, but is not limited to, eleven information elements representing information pertaining to a card holder account.

Account ID field 410 stores a unique account identifier. Account ID field 410 is assigned by the credit card issuer to uniquely identify an account of a card holder. In the present embodiment, the unique account identifier will be a standard 16 digit credit card account number.

Card holder name element 412 stores the name of a card holder 112 who is responsible for the account described by the account table record. Card holder name element may be a single field, but will more likely be a combination of fields, including first name, last name and middle initial.

Address element 414 stores the mailing address of the card holder. Although the preferred embodiment shows only one address element, it may be useful to provide multiple address elements to accommodate a home address, a billing address and a business address. Address element 414 may be a single field, but preferably includes a combination of fields, including street, city, state and postal code.

Telephone number field 416 stores the home telephone number of the card holder 112 responsible for the account. Additional telephone numbers, such as office and facsimile numbers, may also be stored in account table 400.

Total credit line field 418 stores the maximum amount of credit that the credit card issuer has provided to the card holder responsible for the account. Available credit line field 420 stores the amount of unused credit available to the credit card holder responsible for the account. Although available credit line field 420 is stored in account table 400 in the preferred embodiment, this information could be calculated as necessary by subtracting the outstanding balance from the contents of total credit line field 418.

The present embodiment of the invention further includes average quarterly charge volume field 422, average quarterly outstanding balance field 424, average transactions per month field 426 and risk score field 428, all containing data which describe various characteristics of an account. These fields are populated by CCI 200 based on data maintained in transaction table 600, and may be used as a predictors of future account activity. The contents of these fields are self-explanatory and may be derived in a variety of well-known ways.

Card holder account table 400 further includes affinity group ID field 430. Field 430 stores an affinity group identifier which identifies the affinity group to which the card holder belongs. The contents of field 430 can be used as an index into affinity group table 300 to retrieve information regarding the identified affinity group.

FIG. 5 illustrates the contents of group target/reward table 500. Each record of group target/reward table 500 represents information pertaining to a performance target and corresponding reward offered to a particular affinity group. This table enables a credit card issuer to set, track, evaluate and reward the desired performance of card holders affiliated with an affinity group. The fields of group target/reward table 500 are populated with values determined by the credit card issuer. The steps for determining these values are described in more detail with reference to FIG. 7.

Affinity group ID field 510 stores a code that uniquely identifies an affinity group having a related record in affinity group table 300. Target period element 512 identifies the period of time which the credit card holders affiliated with the affinity group are provided to achieve a defined target. In the example shown in FIG. 5, target period element 512 is based on calendar quarters. In alternative embodiments, however, the target periods could be months, years or based on specific start and end dates.

Target type field 514 stores a code representing a type of target assigned to the affinity group identified by field 510. Although field 514 typically only contains a code, the contents of field 514 illustrated in FIG. 5 show the logical representations of the assigned target types. The type of performance target applicable to an affinity group is generally selected from a set of target types defined by the credit card issuer. In the example shown in FIG. 5, target type field 514 may store a code representing a minimum average quarterly charge volume, a minimum average quarterly outstanding balance, a maximum average default performance and a minimum average number of transactions per month. Of course, credit card issuers may define numerous alternative target types including, but not limited to, minimum monthly principle payments, minimum annual purchases at specific merchants and minimum balance transfer amounts.

Target parameter field 516 stores the performance level at which the members of an affinity group must perform, in aggregate, during the period identified by target period element 512 to achieve a reward. The data stored in target parameter field 516 is used to determine whether an affinity group has achieved the target set by the credit card issuer. Of course, the particular use of target parameter field 516 is dependent on the contents of target type field 514. Performance parameter field 518 stores the actual aggregate performance of the card holders affiliated with the affinity group identified by field 510. Preferably, CCI 200 updates field 518 is periodically throughout the target period. Alternatively, CCI 200 could update field 518 once at the end of the target period or simply calculate the actual aggregate performance value as needed.

Reward type field 520 stores a code representing a type of reward offered to the affinity group identified by field 510 for the target period 512. Like target type field 514, reward type field 520 typically only contains a code. The logical representations of the code of field 520 are illustrated in FIG. 5. As shown, the example reward types illustrated in FIG. 5 include a cash rebate reward, a frequent flyer mile reward and an flat contribution reward. Numerous alternative reward types are possible, including without limitation, magazine subscriptions, free gifts and discount coupons.

Reward terms element 522 stores a code representing the terms of the reward associated with the record. CCI 200 uses the data of reward terms field 522 to provide rewards to an affinity group sponsor in the event the performance target has been achieved. The meaning of reward terms field is interpreted based, in part, on the value of reward type field 520.

Referring now to FIG. 6, there is illustrated the contents of transaction table 600. Each record of transaction table 600 represents a transaction between a credit card holder and a merchant. Transaction table 600 includes the following seven fields: transaction ID field 608; account ID field 610; merchant ID field 612; transaction amount field 614; date field 616; time field 618; and credit card authorization number 622. Transaction table 600 may be used to analyze the account activity of each account stored in card holder account table 400. Analysis of account activity may be performed in any number ways well known by one of ordinary skill in the credit card processing field.

System Operation

Having thus described the system architecture and components of the present embodiment, the operation of the system will now be described in greater detail with reference to FIGS. 7–8, and continuing reference to FIGS. 1–6. It is to be understood that the software instructions necessary to provide the functionality described herein are preferably stored in ROM 216 or storage device 220 of CCI 200.

Figure 7:
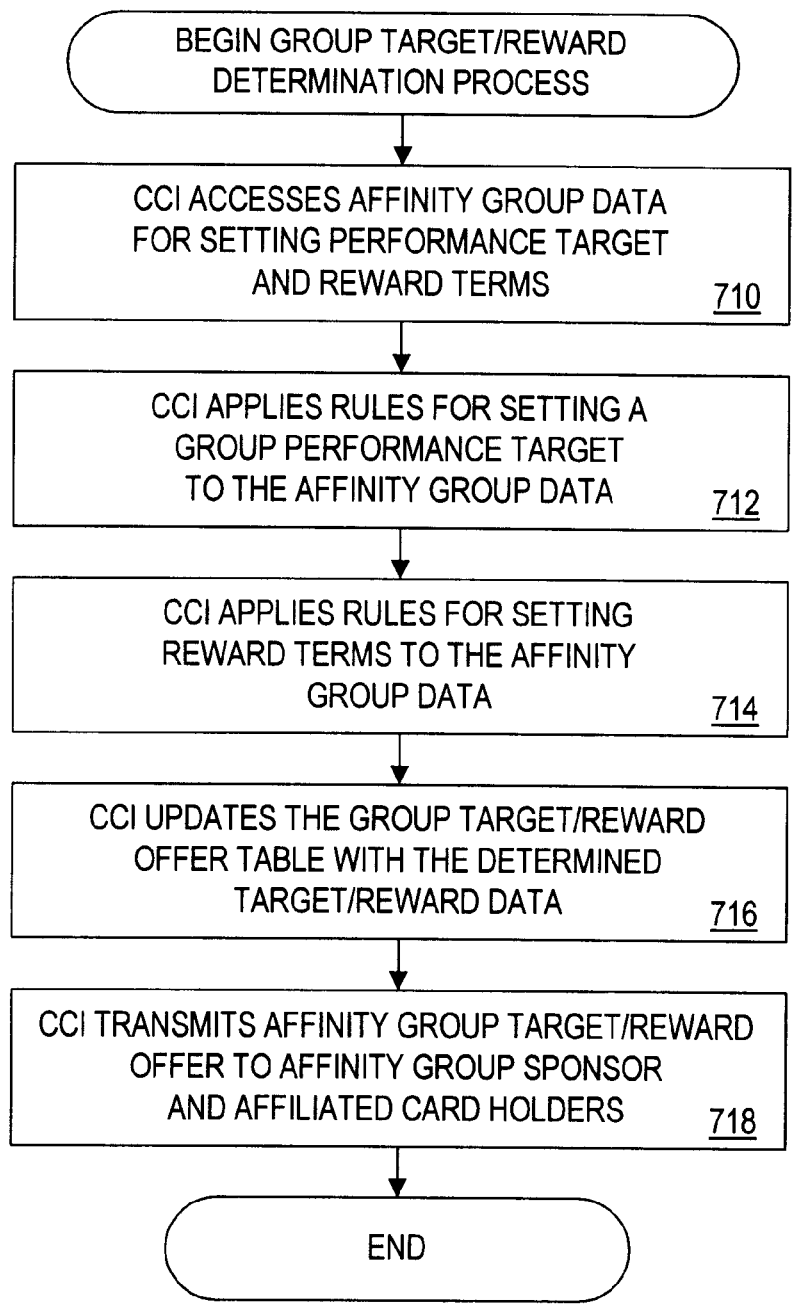
FIG. 7 shows a flow chart illustrating the computer implemented steps used to implement the method of the present invention.
Figure 8:
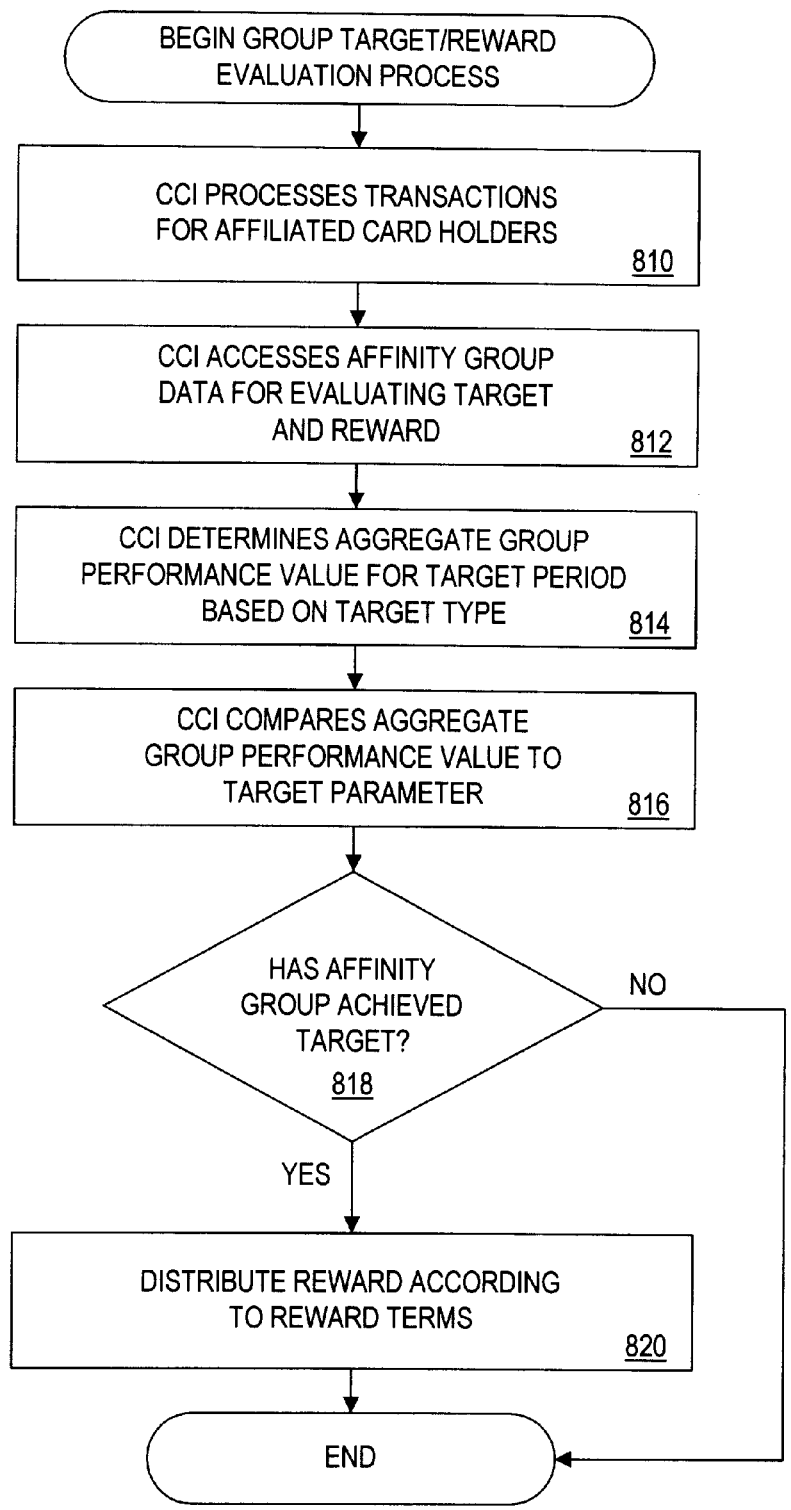
FIG. 8 shows a flow chart illustrating the computer implemented steps used to determine earned rewards according to one embodiment of the present invention.

Referring now to FIG. 7, the process for determining an affinity group target and reward will be described. As shown at step 710, CCI 200 accesses data stored in affinity group table 300 for setting a performance target and reward terms. The criteria referred to at step 710 includes the historical aggregate performance criteria stored in fields 320, 322, 324 and 326. As previously indicated, these fields are populated by CCI 200 based on an analysis of data stored in records of transaction table 600 and data stored in records of card holder table 400 relating to affiliated member accounts. Although specific criteria are identified in the present embodiment, the criteria may be any information that an issuer believes to be indicative of particular card holder behavior. The criteria forms the basis for determining performance targets, reward terms or both.

At step 712, CCI 200 accesses and applies rules for determining group performance targets. These rules may be stored in a database or otherwise implemented through software. The rules for determining group performance targets are applied against the criteria accessed at step 710. Illustrative examples of rules for determining group performance targets are described with reference to Table I, below.

TABLE I

Rules for determining group performance targets

| Rule | Target Type | Target Parameter |
|---|---|---|
| If aggregate quarterly charge volume (x) is less than a predetermined minimum volume | Aggregate quarterly charge volume | Target aggregate quarterly charge volume = mx |
| If aggregate quarterly outstanding balance (y) is less than a predetermined percentage of aggregate total credit line | Aggregate quarterly outstanding balance | Target aggregate quarterly outstanding balance = ny |
| If transactions per month (z) is less than a predetermined minimum number | Transactions per month | Target transactions per month = pz |

To apply the first rule of Table I, CCI 200 must either retrieve or calculate an aggregate quarterly charge volume for an affinity group at step 710. At step 712, the accessed aggregate quarterly charge volume is compared to a predetermined minimum volume (x). If the accessed volume is less than the minimum volume (x), a target aggregate quarterly charge volume will be set for the affinity group. The target aggregate quarterly charge volume will be equal to the accessed aggregate quarterly charge volume of the affinity group times a multiplier (m). Application of the remaining two illustrative rules is accomplished in a similar fashion, where m, n, p, x, y and z are numbers greater than zero.

The aggregate quarterly charge volume, aggregate quarterly outstanding balance and aggregate number of transactions per month are readily calculated by one having ordinary skill in the art. Of course, the rules of Table I are merely simple illustrative examples of the numerous rules which could be implemented by a credit card issuer, depending on its particular needs, and that multipliers m, n and p may vary for each affinity group.

It should be recognized that multiple targets and rewards could be determined for some or all affinity groups. It should also be recognized that credit card issuers are not limited to the criteria defined herein. The criteria on which targets are determined may be based on a credit card issuer's interpretation of behavior and revenue scores for the group, on a combination of scores and specific behavior indicators, such as those shown in affinity group table 300, or on any other predictive variable.

At step 714, CCI 200 accesses rules for setting reward terms. In the present embodiment, the selection of the reward type is based on the sponsor's preferred reward stored in field 316 of affinity group table 300.

Like the rules for setting performance targets, these rules may be stored in a database or otherwise implemented through software and are applied against the criteria accessed at step 710. Illustrative examples of rules for setting reward terms are described with reference to Table II, below.

TABLE II

Rules for setting reward terms

| Preferred Reward Type | Rule | Reward Offer |
|---|---|---|
| Frequent flyer miles | If reward level = 1 | Reward offer = 1 mile per dollar charged |
| Frequent flyer miles | If reward level = 2 | Reward offer = 1.5 miles per dollar charged |
| Frequent flyer miles | If reward level = 3 | Reward offer = 2 miles per dollar charged |
| Percent of charge volume | Always | Reward offer = Aggregate quarterly charge volume times j |
| Percent of outstanding balance | Always | Reward offer = Aggregate quarterly outstanding balance times .5% APR |

To apply the first rule of Table II, CCI 200 must retrieve the reward preference of the affinity group stored in field 316 and the reward level of the affinity group stored in field 318 during step 710. At step 714, the retrieved reward preference and reward level are used as an index into Table II and the reward offer of Table II is applied to the affinity group. Application of the remaining rules is accomplished in a similar fashion.

Of course, the rules of Table II are provided as simple illustrative examples of rules for setting affinity group reward terms. Numerous other rules could be implemented by a credit card issuer, depending on its particular needs.

At step 716, CCI 200 updates group target/reward table 500 to reflect the target and reward terms that apply to the affinity group. Specifically, CCI 200 adds a new record to group target/reward table 500 and populates field 510 with the subject affinity group ID; element 512 with data indicating the period of the target and reward offer; fields 514 and 516 with the target type and target parameter determined at step 712; and fields 518 and 520 with the reward type and reward terms determined at step 714.

As shown, at step 718, CCI 200 conveys the affinity group target and reward offer to the affinity group sponsor and the affiliated card holders. The affiliated card holders are preferably informed via a periodic account statement from the credit card issuer. The periodic account statement includes the performance target, the target period and the reward terms to induce card holder 112 to behave in a manner prescribed by the credit card issuer and achieve the communicated performance target during the target period. Although the periodic statement of the present embodiment is a written communication between the issuer and the card holder, the communication could take any number of forms including updating a database accessible by the card holder or transmitting an electronic or facsimile representation of a periodic statement.

The group target and reward evaluation process will now be described with reference to FIG. 8. As previously described with reference to FIG. 1, throughout the target period defined by field 512 of group target/reward table 500, CCI 200 stores transaction data relating to the accounts of affiliated card holders. The transaction data is received from various merchants. At step 810, CCI 200 stores the received data in transaction table 600.

At the end of the target period, as shown by step 812, CCI accesses affinity group data stored in table 300 for evaluating whether the affinity group achieved the defined target and for distributing the defined reward, if appropriate. At step 814, CCI 200 determines an aggregate group performance value for the target period based on the target type stored in field 514.

CCI 200 then compares the determined aggregate group performance value to the target parameter stored in field 516 to determine whether the affinity group members performance met the predetermined target. The comparison is shown by step 816, and if the target has not been achieved, decision step 818 causes the process to terminate.

If the predetermined target has been achieved, CCI 200 distributes rewards as shown at step 820. The distribution of rewards is performed in accordance with the reward type and reward terms stored in fields 520 and 522, respectively. In an alternate embodiment, individual rewards could be distributed to members of the affinity group. Further, if the predetermined target has not been achieved, penalties could be imposed on either the sponsor or the affinity group members, or both.

Another reward type might be the "Group Member Finder's Fee." Although this type of reward, like others previously described, is awarded to the aggregate reward account balance for the affinity group, it may also be awarded to the individual card member's reward account. This reward type is different because it may be awarded to an individual group member who makes an extra effort on behalf of the group. For example, an existing group member and card holder may refer a candidate for group membership to the credit card issuer. If that referral turns into a new membership, the system of the present invention can distribute a finder's fee reward to the affinity group's reward account balance and to the referring member's reward account.

While the best mode for carrying out the invention has been described in detail, those familiar with the art to which the invention relates will recognize various alternative designs and embodiments for practicing the invention. These alternative embodiments are within the scope of the present invention. Accordingly, the scope of the present invention embodies the scope of the claims appended hereto.

We claim:

1. A method for generating a customized reward offer for a sponsor of an affinity group, said method comprising the steps of:
   accessing transaction data, said transaction data associated with a plurality of financial accounts, each controlled by a member of said affinity group;
   determining aggregate performance data based on said transaction data, said aggregate performance data describing activity of said plurality of financial accounts; and
   determining a performance target based on said aggregate performance data.

2. The method of claim 1 wherein said step of determining aggregate performance data includes a step of deriving an average outstanding balance.

3. The method of claim 1 wherein said step of determining aggregate performance data includes a step of deriving an average charge volume.

4. The method of claim 1 wherein said step of determining aggregate performance data includes a step of deriving an average number of transactions over a predetermined period.

5. The method of claim 1 wherein the step of determining aggregate performance data includes a step of deriving an aggregate behavior score.

6. The method of claim 1 wherein the step of determining aggregate performance data includes a step of deriving an aggregate profitability score.

7. The method of claim 1 wherein the step of determining aggregate performance data includes a step of deriving an aggregate credit score.

8. The method of claim 1 wherein the step of determining aggregate performance data includes a step of deriving an aggregate performance score.

9. The method of claim 1 wherein said step of determining a performance target includes the steps of:
   accessing comparative performance data; and
   comparing said aggregate performance data to said comparative performance data.

10. The method of claim 9 wherein said comparative data describes performance from a previous period.

11. The method of claim 9 wherein said comparative data describes performance of a plurality of financial accounts, said plurality of financial accounts including at least one financial account controlled by a non-member.

12. The method of claim 1 further comprising the steps of:
    selecting a reward offer associated with said performance target; and
    transmitting said performance target and said reward offer to said sponsor.

13. The method of claim 12 wherein said step of selecting a reward offer includes the step of accessing reward preference data and wherein said reward offer is associated with said reward preference data.

14. The method of claim 12 wherein the step of transmitting includes a step of printing a periodic statement.

15. The method of claim 12 further comprising a step of transmitting said performance target to each member.

16. The method of claim 15 wherein the step of transmitting said performance target to each member includes a step of printing a periodic account statement.

17. The method of claim 12 wherein the step of transmitting includes a step of updating a database electronically accessible by said sponsor.

18. A method for processing a reward for a sponsor of an affinity group based on a plurality of financial accounts, said method comprising the steps of:
    retrieving performance target data associated with said affinity group including a performance target parameter;
    aggregating transaction data associated with said plurality of financial accounts to determine an aggregated performance value;
    comparing said aggregated performance value to said performance target parameter to determine whether the reward is earned; and
    if the reward is earned, processing the steps of:
      accessing reward offer data associated with said performance target data; and
      updating affinity group account data to reflect the reward.

19. The method of claim 18 wherein the step of updating includes a step of modifying reward program point data.

20. The method of claim 19 wherein said reward program point data represents frequent flyer miles associated with said sponsor.

21. The method of claim 18 wherein the step of updating includes a step of processing a rebate.

22. The method of claim 18 further comprising the step of updating account data associated with at least one of the affiliated financial accounts to reflect a member reward, said step of updating account data being performed if said reward is earned.

23. The method of claim 22 wherein said account data associated with at least one of the affiliated financial accounts includes individual reward data representing rewards based on performance of said member and group reward data representing rewards based on performance of said affinity group.

24. The method of claim 18 further comprising the step of updating affinity group account data to reflect a penalty.

25. The method of claim 18 further comprising the step of updating account data associated with at least one of the affiliated financial accounts to reflect a member penalty, said step of updating account data being performed if said reward is not earned.

26. A device for generating a customized reward offer for a sponsor of an affinity group sponsor, said device comprising:
- a memory configured to store:
  - data associated with said affinity group sponsor,
  - transaction data associated with a plurality of financial accounts, each controlled by a member of said affinity group,
  - aggregating performance data describing activity of said plurality of financial accounts,
  - target data specifying a performance target, and reward data specifying a reward; and
- a processor operatively connected to said memory, said processor configured to:
  - access said transaction data,
  - determine said aggregate performance data based on said transaction data, and
  - determine said performance target data based on said aggregate performance data.

27. The device of claim 26 wherein said processor is further configured to derive an average outstanding balance to determine said aggregate performance data.

28. The device of claim 26 wherein said processor is further configured to derive an average charge volume to determine said aggregate performance data.

29. The device of claim 26 wherein said processor is further configured to derive an average number of transactions over a predetermined period step to determine said aggregate performance data.

30. The device of claim 26 wherein said processor is further configured to derive an aggregate behavior score to determine said aggregate performance data.

31. The device of claim 26 wherein said processor is further configured to derive an aggregate profitability score to determine said aggregate performance data.

32. The device of claim 26 wherein said processor is further configured to derive an aggregate credit score to determine said aggregate performance data.

33. The device of claim 26 wherein said processor is further configured to derive an aggregate performance score to determine said aggregate performance data.

34. The device of claim 26 wherein said memory is further configured to store comparative performance data; and said processor is further configured to access said comparative performance data and compare said aggregate performance data to said comparative performance data to determine said performance target.

35. The device of claim 34 wherein said comparative data describes performance from a previous period.

36. The device of claim 34 wherein said comparative data describes performance of a plurality of financial accounts, said plurality of financial accounts including at least one financial account controlled by a non-member.

37. The device of claim 26 wherein said processor is further configured to:
- select said reward data associated with said performance target; and
- transmit said performance target and said reward offer to said sponsor.

38. The device of claim 37 wherein said processor is further configured to access reward preference data to select a reward offer and wherein said reward offer is associated with said reward preference data.

39. The device of claim 37 wherein said processor is further configured to print a periodic statement.

40. The device of claim 37 wherein said processor is further configured to transmit said performance target to each member.

41. The device of claim 40 wherein said processor is further configured to print a periodic account statement.

42. The device of claim 36 wherein said processor is further configured update a database electronically accessible by said sponsor.

43. A device for processing a reward for a sponsor of an affinity group based on account performance of a plurality of related financial accounts, said device comprising:
- a memory configured to store:
  - a performance target parameter;
  - reward offer data associated with said performance target parameter;
  - transaction data associated with the plurality of financial accounts; and
  - affinity group account data;
- a processor operatively connected to said memory, said processor configured to:
  - retrieve said performance target parameter;
  - aggregate said transaction data to determine an aggregated performance value;
  - compare said aggregated performance value to said performance target parameter to determine whether said reward is earned and
  - if said reward is earned, said processor configured to:
    - access said reward offer data associated with said performance target parameter; and
    - update affinity group account data to reflect said reward.

44. The device of claim 43 wherein said processor is further configured to modify reward program point data.

45. The device of claim 44 wherein said reward program point data represents frequent flyer miles associated with said sponsor.

46. The device of claim 43 wherein said processor is further configured to process a rebate.

47. The device of claim 43 wherein said processor is further configured to update member account data associated with at least one of the affiliated financial accounts to reflect a member reward, if said reward is earned.

48. The device of claim 47 wherein said account data associated with at least one of the affiliated financial accounts includes individual reward data representing rewards based on performance of said member and group reward data representing rewards based on performance of said affinity group.

49. The device of claim 43 wherein said processor is further configured to update said affinity group account data to reflect a penalty.

50. The device of claim 43 wherein said processor is further configured to update member account data associated with at least one of the affiliated financial accounts to reflect a member penalty, if said reward is not earned.

51. A computer-readable storage medium encoded with processing instructions for implementing a method for generating a customized reward offer for a sponsor of an affinity group, said processing instructions for directing a computer to perform the steps of:
- accessing transaction data, said transaction data associated with a plurality of financial accounts, each controlled by a member of said affinity group;
- determining aggregate performance data based on said transaction data, said aggregate performance data describing activity of said plurality of financial accounts; and determining a performance target based on said aggregate performance data.

52. A computer-readable storage medium encoded with processing instructions for implementing a method for processing a reward for a sponsor of an affinity group based on a plurality of affiliated financial accounts, said processing instructions for directing a computer to perform the steps of:

retrieving performance target data associated with said affinity group including a performance target parameter;

aggregating transaction data associated with said plurality of financial accounts to determine an aggregate performance value;

comparing said aggregated performance value to said performance target parameter to determine whether the reward is earned; and if the reward is earned, processing the steps of:

accessing reward offer data associated with said performance target data; and updating affinity group account data to reflect the reward.

* * * * *